(12) United States Patent
Yamada et al.

(10) Patent No.: US 6,371,328 B1
(45) Date of Patent: Apr. 16, 2002

(54) HEAT INSULATING CONTAINER

(75) Inventors: Masashi Yamada; Takafumi Fujii; Kunio Matsuda, all of Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/517,671

(22) Filed: Mar. 2, 2000

(30) Foreign Application Priority Data

Mar. 8, 1999 (JP) .......................................... 11-060894

(51) Int. Cl.[7] .............................................. B65D 81/38
(52) U.S. Cl. ................ 220/592.2; 215/12.1; 220/62.18; 220/62.22
(58) Field of Search .......................... 220/573.4, 574.2, 220/592.16, 592.17, 592.2, 592.22, 592.26, 592.27, 592.28, 23.86, 23.87, 23.89, 62.12, 62.13, 62.18, 62.22, 651, 652, FOR 132, FOR 134, FOR 137, FOR 138, FOR 139, FOR 140, FOR 143, FOR 142, FOR 157, FOR 158, FOR 159, FOR 160; 215/12.1, 13.1; 29/509, 513, 514; 62/371, 457.1–457.9

(56) References Cited

U.S. PATENT DOCUMENTS

| | | | | |
|---|---|---|---|---|
| 3,120,570 A | * | 2/1964 | Kennedy et al. ........ | 215/13.1 X |
| 4,047,633 A | * | 9/1977 | Trombly .................. | 220/592.2 |
| 4,735,835 A | * | 4/1988 | Taira et al. ........... | 220/62.11 X |
| 4,768,354 A | * | 9/1988 | Barnwell ................ | 220/592.17 |
| 5,040,317 A | * | 8/1991 | Kadjevich .............. | 215/13.1 X |
| 5,515,995 A | * | 5/1996 | Allen et al. ............ | 220/592.16 |
| 5,573,141 A | * | 11/1996 | Chen .................. | 220/592.17 X |

* cited by examiner

Primary Examiner—Stephen Castellano
(74) Attorney, Agent, or Firm—Merchant & Gould P.C.

(57) ABSTRACT

The present invention is disclosed to provide a heat insulating container constructed to avoid the deterioration of an appearance or to prevent the noisy sound from occurring by the scraps generated in the course of welding. An inner casing is arranged in an outer casing so as to maintain a space therebetween, the inner casing and the outer casing being joined by welding and a scrap movement blocking member is provided at least one of the inner and outer casings for preventing the scraps generated in the process of welding moving into the space.

1 Claim, 5 Drawing Sheets

HEAT INSULATING CONTAINER

BACKGROUND OF THE INVENTION

FIELD OF THE INVENTION

The present invention relates to heat insulating containers for containing beverage and the like.

DESCRIPTION OF THE PRIOR ART

Conventionally, there has been a double-walled heat insulating container in an integral body where an inner casing made of synthetic resin such as polypropylene resin is arranged in an outer casing made of synthetic resin such as polypropylene resin so as to maintain a space therebetween.

These types of double-walled heat insulating containers may be manufactured by a method where an inner casing is arranged in an outer casing so as to maintain a space therebetween and the openings of the inner casing and the outer casing are joined by a welding method such as vibration welding or the like. However, there are cases where casing scraps, fragments and particles generated from the welded portions fall into the space between the inner casing and the outer casing, when the openings of the inner casing and the outer casing are welded.

Recently, transparent materials are used as materials for the casings. However, there is a problem in that when the transparent materials are used for the casings, the casing scraps fallen into the space may be seen by naked eyes, thereby deteriorating an appearance of the container. There is another problem in that unpleasant noise harsh to the ear is generated by the scraps colliding against the casings in the space when the container is rocked or shaken, regardless of transparent materials or opaque materials for the casing.

SUMMARY OF THE INVENTION

The present invention is disclosed to solve the aforementioned problems and it is an object of the present invention to provide a heat insulating container constructed to avoid the deterioration of an appearance or to prevent the noisy sound from occurring by the scraps generated in the course of welding.

The above-mentioned object of the present invention is solved by providing a heat insulating container comprising: an outer casing; an inner casing arranged in the outer casing so as to maintain a space therebetween, the inner casing and the outer casing being joined by welding; and a scrap movement blocking member provided at least at one of the inner casing and the outer casing for preventing scraps generated in the process of welding from moving into the space.

As a scrap movement blocking member, materials having a surface adhesive property may be used to thereby capture the scraps on the surface thereof.

Moreover, a scrap movement blocking member may be insertedly formed between the inner casing and the outer casing. In this case, the scrap movement blocking member may be elastically deformable.

Moreover, a heat insulating container according to the present invention may comprises an outer casing; an inner casing arranged in the outer casing so as to maintain a space therebetween, the inner casing and the outer casing being joined by welding; and a scrap movement blocking wall formed at least at one of the inner casing and the outer casing for preventing scraps generated in the process of welding from moving into the space.

The heat insulating container according to the present invention is characterized in that the heat insulating container comprises an outer casing; an inner casing arranged in the outer casing so as to maintain a space therebetween, the inner casing and the outer casing being joined by welding; and a scrap movement blocking member provided at least at one of the inner casing and the outer casing for preventing scraps generated in the process of welding from moving into the space.

Accordingly, the heat insulating container according to the present invention can be free of scraps in the space between the casings and form a beautiful appearance. Furthermore, noisy sound generated by scraps colliding against the casings when the container is rocked or shaken can be prevented in advance.

As a scrap movement blocking member, materials having a surface adhesive property may be used to thereby capture the scraps on the surface thereof.

Furthermore, the scrap movement blocking member may be insertedly formed between the inner casing and the outer casing. In this case, the scrap movement blocking member may be elastically deformable.

Furthermore, a heat insulating container according to the present invention comprises an outer casing; an inner casing being arranged in the outer casing so as to maintain a space therebetween, the inner casing and the outer casing being joined by welding; and a scrap movement blocking wall formed at least at one of the inner casing and the outer casing for preventing scraps generated in the process of welding from moving into the space.

In accordance with the last embodiment, the number of parts are minimized for simplification of the manufacturing process and to facilitate manufacturing work, since a scrap movement blocking member is not needed.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

Figure 1:
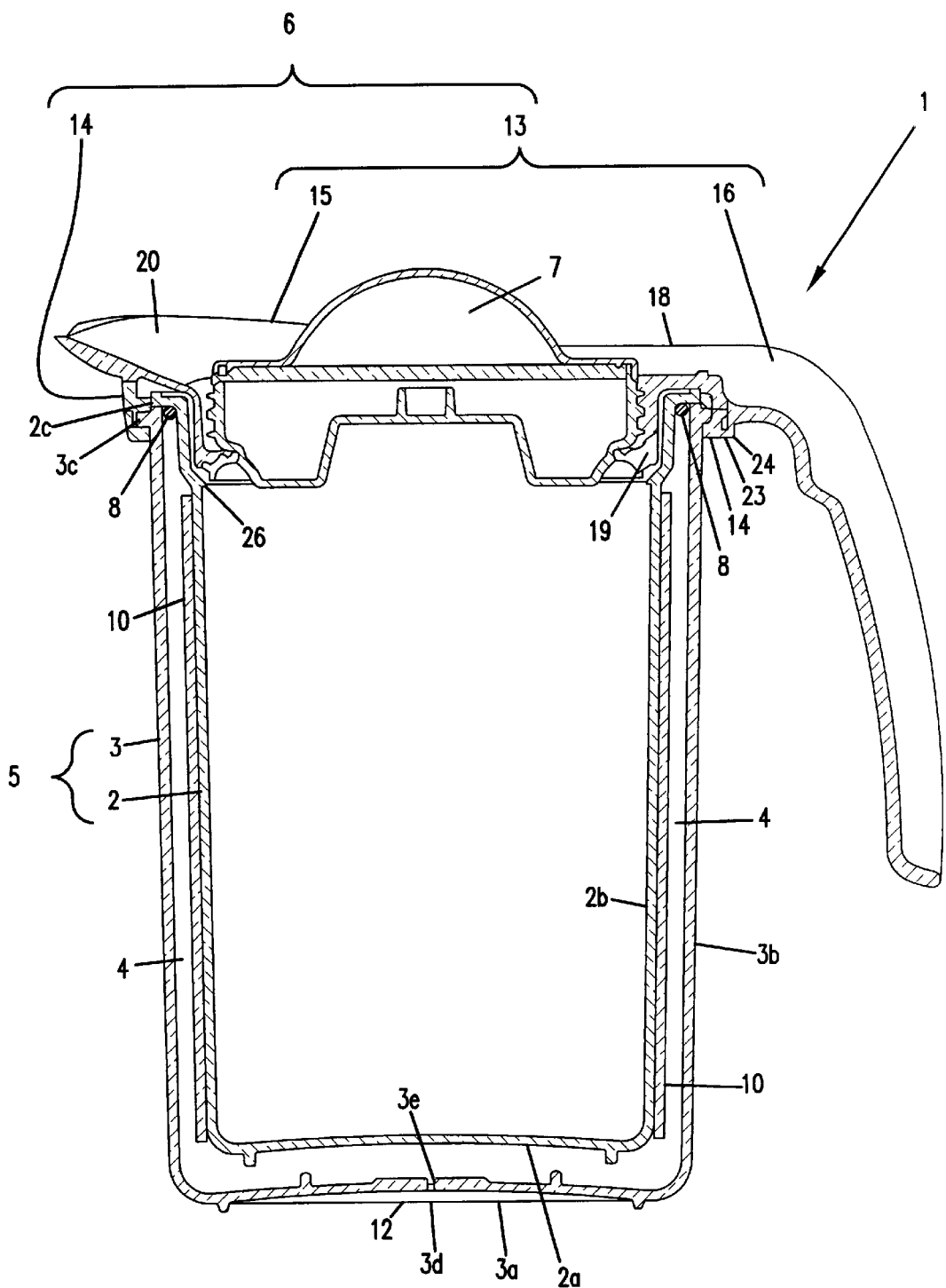
FIG. 1 is a cross-sectional view for illustrating a first embodiment of a heat insulating container according to the present invention.
Figure 2:
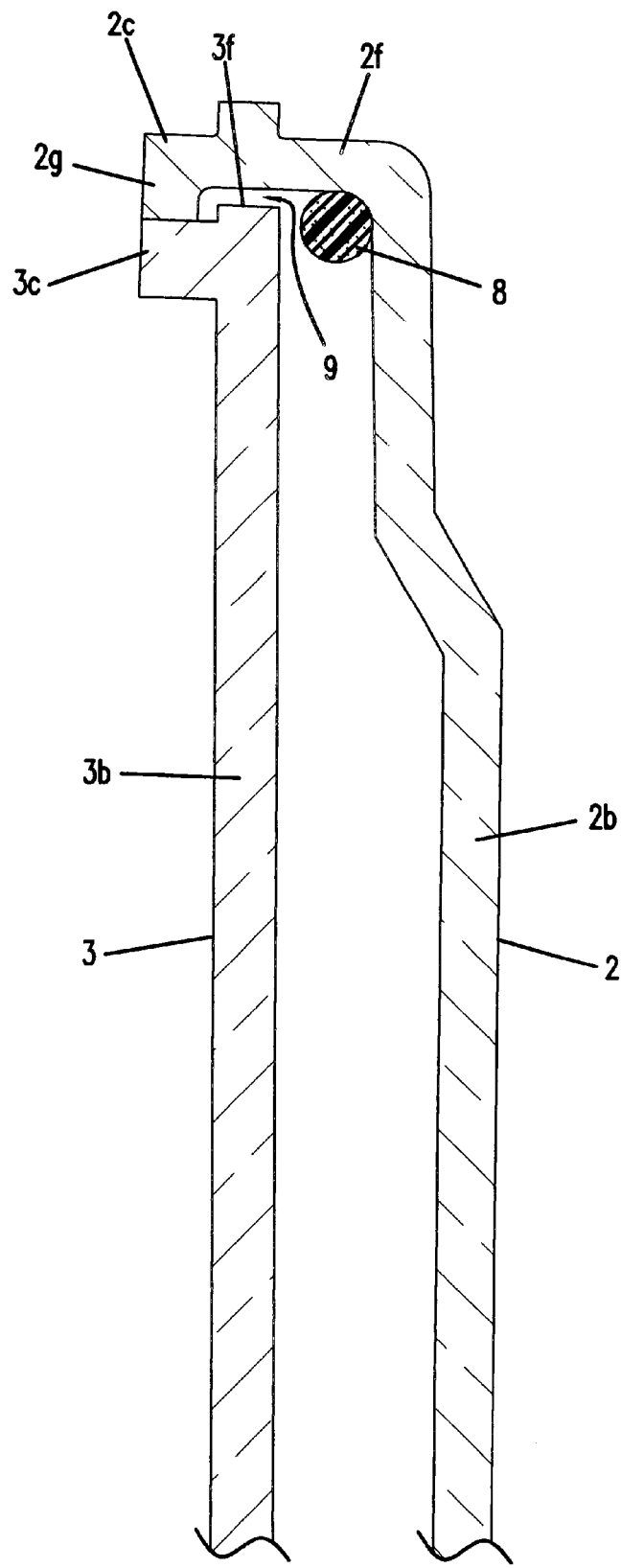
FIG. 2 is an enlarged schematic view of principal parts in the heat insulating container illustrated in FIG. 1.
Figure 3:
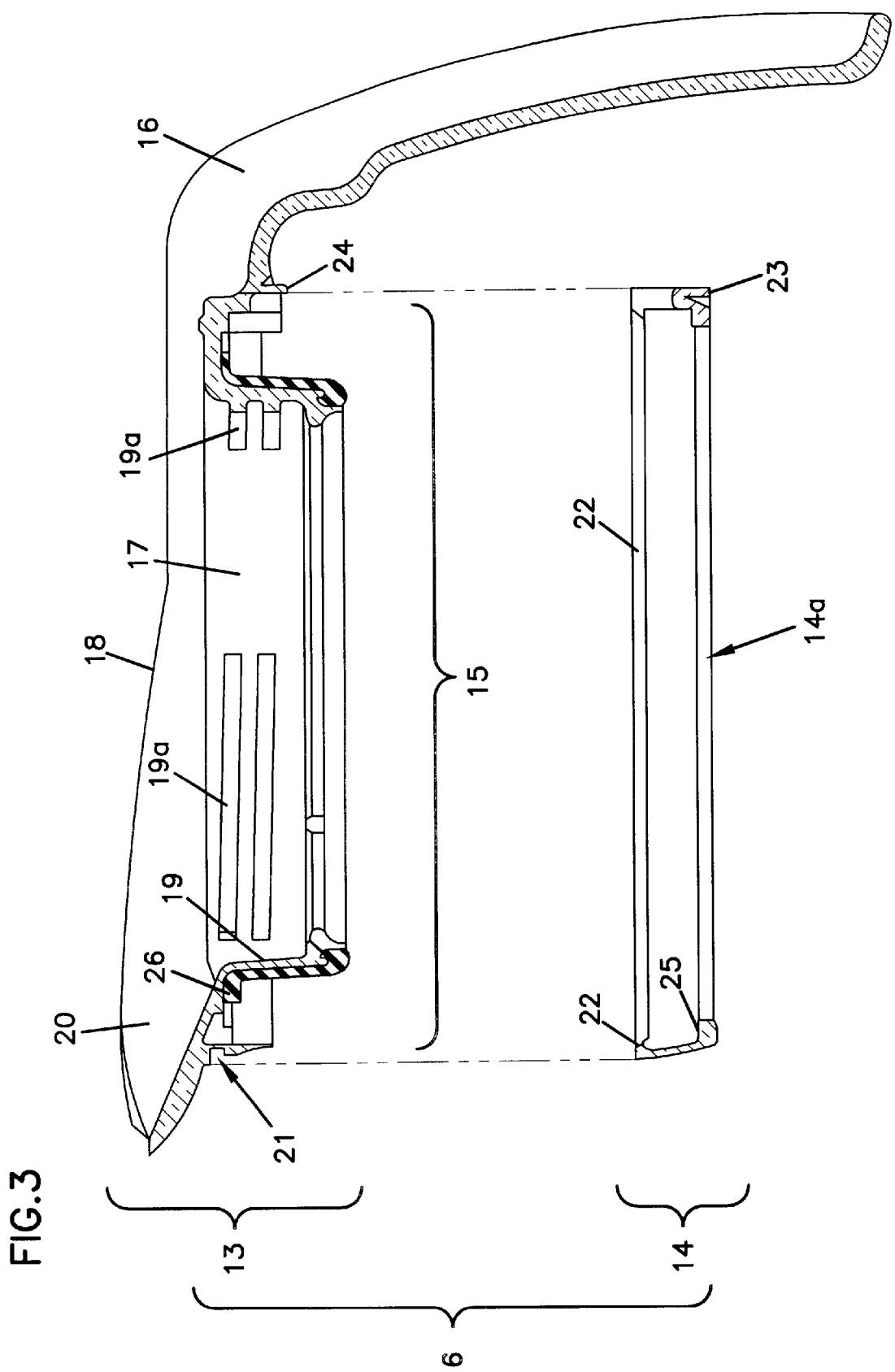
FIG. 3 is an enlarged schematic view of other principal parts in the heat insulating container illustrated in FIG. 1.

FIGS. 1, 2 and 3 illustrate the first embodiment of a heat insulating container according to the present invention, where the heat insulating container 1 includes a double-walled container 5 in which an inner casing 2 is arranged in an outer casing 3 with a space 4 therebetween into an integral body, a shoulder member 6 attached to an end of an opening of the double-walled container and a cap 7 for closing the opening of the double-walled container 5.

The present embodiment illustrates a heat insulating container where a gas having a low thermal conductivity is charged into the space to thereby increase a thermal insulating ability.

An inner casing 2 is a bottomed cylindrical tube having a disc-shaped bottom plate 2a, a tube 2b upwardly extended from the periphery of the bottom plate 2a and a flange 2c formed at an upper end of the tube 2b, the flange 2c being outwardly protruded toward diarmetral direction. The flange 2c includes a base 2f and a tip end 2g downwardly protruded from the end of the base 2f.

The inner casing 2 may be made of synthetic resin. Particularly, it is preferable to use a synthetic resin showing a gas permeability rate below 1 $g/m^2/24$ hr/atm with regard to $O_2$, $N_2$ and $CO_2$. In case the gas permeability rate exceeds the above value, there may be generated a gas permeation from the surfaces of the inner casing 2 and the outer casing 3 during a long use thereof to thereby decrease a heat insulating characteristic.

Furthermore, it is preferable to use a transparent material for the inner casing 2 since the liquid contents within the inner casing can be seen and checked from outside by naked-eyes. In more detail, it is preferable to use a synthetic resin such as polyethylenenaphthalene resin, polyacrylonitrile resin, methyl methacrylate resin or the like. The outer surface of the tube 2b is covered with a radiation preventing film over the length ranging from an upper portion of the tube 2b to the vicinity of the bottom plate 2a.

The radiation preventing film 10 serves to reduce a heat loss due to radiative heat transfer when the liquid contents is contained in the double-walled container 5. For example, a film-shaped base material with metal particles deposited thereon by a deposition or a sputtering may be used. As metal particles, antimony-doped tin oxide (ATO), tin-doped indium oxide (ITO) or the like may be preferable due to their high infrared reflection factor. Film 10 having a visible ray permeability ratio of 45~80% and an infrared reflection factor of 75~90% may be used. A product on the market preferable for the film 10 may be a heat mirror film manufactured by Mitsui Chemical Company.

An outer casing 3 is a bottomed cylindrical tube having a disc-shaped bottom plate 3a, a tube 3b upwardly extended from the periphery of the bottom plate 3a and a flange 3c formed at an upper end of the tube 3b, the flange 3c being outwardly protruded toward diametral direction.

Furthermore, the flange 3c is formed at the upper surface thereof with a upwardly-protruded convex 3f. In the heat insulating container 1 according to the present invention, the inner casing 2 and the outer casing 3 can be easily positioned by way of the tip end 2g formed on the flange 2c and the convex 3f formed on the flange 3c.

The bottom plate 3a of the outer casing 3 is formed at an approximately central portion thereof with a round-shaped concave 3d toward the space and a through hole 3e is formed in the concave 3d.

The through hole 3e is blocked by a sealing plate 12 adhered to the bottom plate 3a by an adhesive agent such as a cyanoacrylate-based adhesive agent or the like. The sealing plate 12 made of polycarbonate or the like may be used.

The outer casing 3 made of transparent material, by way of example, transparent material having a visible ray permeability ratio of over 45% can be used. The material thereof may be preferably synthetic resin or the like. Particularly, it is preferable to use that synthetic resin having a gas permeability rate of less than 1 $g/m^2/24$ hr/atm with regard to $O_2$, $N_2$, $CO_2$. In case the gas permeability rate exceeds the above-mentioned value, a gas permeation from surfaces of the inner casing 2 and the outer casing 3 occurs during a long use to thereby easily decrease a heat insulating characteristic. In more detail, it is preferable to use synthetic resin such as polyethylenenaphthalene resin, polyacrylonitrile resin, methyl methacrylate resin or the like.

The lower surface of the tip end 2g of the flange 2c of the inner casing 2 is joined over the whole periphery thereof to the upper surface of the flange 3c of the outer casing 3 by a welding method such as vibration welding or the like.

It should be noted that there is formed a space between a base 2f of the flange 2c and the flange 3c of the outer casing 3, the space being hereinafter referred to as gap 9.

In the heat insulating container 1 according to the present invention, an uppermost vicinity of the external surface of the tube 2b of the inner casing 2 is provided over the whole periphery thereof with a scrap movement blocking member 8 having a surface adhesive property.

Since the scrap movement blocking member 8 serves to capture scraps (hereinafter referred to as scrap particles) generated from the welded portions in the process of welding (described later) to thereby block movement of the scrap particles toward the space 4. The blocking member 8 may be a ring-shaped object having a diameter of about 1~10 mm.

The scrap movement blocking member 8 may be made of silicon-based resin. The base resin material such as polyester resin or the like with the surface thereof coated by adhesive agent such as polyisobutylene, acrylic resin or the like can be preferably used for the blocking member.

The scrap movement blocking member 8 is preferably so provided that at least a part thereof is positioned at a lower place than the upper end surface of the tube 3b.

Furthermore, the space 4 between the inner casing 2 (tube 2b) and the outer casing 3 (tube 3b) is preferred to have a clearance of 1~8 mm. It is further preferred that the gap is 3~8 mm.

It is preferred that the space 4 is charged with a gas having a thermal conductivity κ lower than that of air ($κ=2.41 \times 10^{-2}$ $W \cdot m^{-1} \cdot K^{-1}$; 0° C.), for example, xenon ($κ=0.52 \times 10^{-2}$ $W \cdot m^{-1} \cdot K^{-1}$; 0° C.), krypton ($κ=0.87 \times 10^{-2}$ $W \cdot m^{-1} \cdot K^{-1}$; 0° C.), or argon ($κ=1.63 \times 10^{-2}$ $W \cdot m^{-1} \cdot K^{-1}$; 0° C.), or a mixture thereof.

The shoulder member 6 includes an upper part 13 and a lower part 14, each part being mutually engaged. The upper part 13 is disposed with an upper part body 15 and a handle attached to the body 15. The upper part body 15 includes a ring-shaped portion 18 having an opening 17 and a tubular cap receiving portion 19 downwardly extended from the periphery of the opening 17. The ring-shaped portion 18 is provided with an outlet 20 for poring fluid contents of the inner casing 2. The ring-shaped portion 18 is formed at its outer periphery along the peripheral direction with a groove-shaped concave 21. The concave 21 is circumferentially formed at outer periphery of the ring-shaped portion 18 except for the vicinity of the handle 16. The cap receiving portion 19 is formed with a screw 19a at an inner surface thereof.

Furthermore, the handle of the ring-shaped portion 18 is provided at the vicinity of the base end thereof with a welding part 24 welded to another welding part 23 of the lower part 14 (described later).

The lower part 14 is ring-shaped and the inner diameter of the opening 14a thereof is set to be larger than the outer diameter of the uppermost portion of the tube 3b at the outer casing 3 but smaller than an outer diameter of the flange 3c.

The inner periphery of the lower part 14 is formed at uppermost portion thereof with a convex 22 for engaging with the concave 21 disposed in the ringshaped portion 18 of the upper part 13. The convex 22 is inwardly protruded from an inner periphery of the lower part 14 and provided along the whole periphery thereof except for the vicinity of the handle 16.

The inner periphery of the lower part 14 is inwardly protruded and formed at the lowermost with an abutment 25 abutting on the flange 3c of the outer casing 3.

The lower part 14 is provided at the vicinity of the handle base end thereof with the welding part 23 for being welded to the welding part 24.

The cap receiving portion 19 is screwed by the cap 7 formed with a screw for being screwed to the screw 19a, such that the opening 17 of the ring-shaped 18 is closed.

Furthermore, a packing 26 is provided between the cap receiving portion 19 of the upper part 13 and the inner casing 2.

Next, a method for manufacturing the heat insulating container 1 will be described.

The scrap movement blocking member 8 is provided at an uppermost outer peripheral surface of the tube 2b of the inner casing 2 and the radiation preventing film 10 is deposited on the outer peripheral surface of the tube 2b.

Successively, the inner casing 2 is arranged in the outer casing 3, and the lower surface of the tip end 2g of the flange 2c and the upper surface of the flange 3c are mutually joined by way of vibration welding, spin welding, hot plate welding, friction welding, orbital welding or the like.

Parts of the inner casing 2 and the outer casing 3 are broken into particles and scattered in the course of welding. But most of the scrap particles diametrically directing into an inner side through the gap 9 are captured on the surface of the scrap movement blocking member 8 having a surface adhesive property.

Then, air in the space 4 between the inner casing 2 and the outer casing 3 is discharged by a vacuum discharge pump or the like via a through hole 3e of the outer casing 3 and a gas having a low thermal conductivity is charged into the space 4 through the through hole 3e, where the through hole 3e is sealed by the sealing plate 12 thereafter.

Successively, the upper part 13 is attached to the opening end of the inner casing 2 so that the cap receiving portion 19 can be positioned in the inner casing 2, and at the same time, the lower part 14 is engaged with the upper part 13 by insertedly and forcibly engaging the convex 22 of the lower part 14 with the concave 21 formed at the upper part 13.

Successively, the cap 7 is screwed to the cap receiving portion 19 to thereby obtain the heat insulating container 1 illustrated in FIG. 1.

Since in the heat insulating container 1, the tube 2b of the inner casing 2 is provided at the uppermost thereof with the scrap movement blocking 8 having a surface adhesive property, the scrap particles generated in the process of welding are captured on the surface of the scrap movement blocking member 8 to thereby prevent the scrap particles from moving into the space 4.

Accordingly, no scrap particles remain in the space 4 to thereby allow obtaining a good-looking appearance of the heat insulating container 1.

Furthermore, even in case the container 1 is rocked or shaken, the previous problem that the scrap particles in the space 4 generate a noisy sound by colliding against the casings does not occur.

Next, the second embodiment of the present invention will be described.

Figure 4:
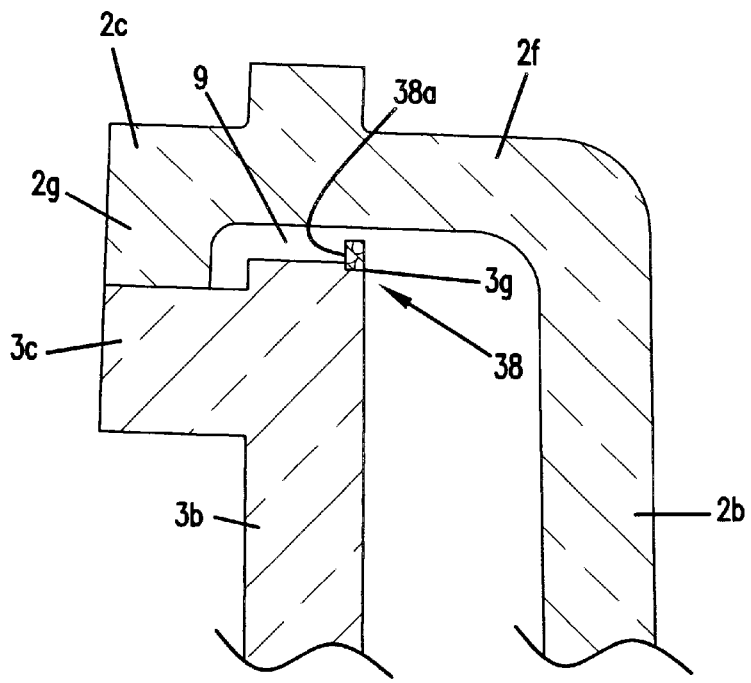
FIG. 4 is a cross-sectional view for illustrating a second embodiment of a heat insulating container according to the present invention.

FIG. 4 illustrates the second embodiment of a heat insulating container according to the present invention, where the heat insulating container of the second embodiment is different from that of the first embodiment in that it uses a tape-shaped scrap movement blocking member 38 instead of the scrap into movement blocking member 8.

It is preferable to use the scrap movement blocking member 38 having adhesive agent applied on one side or both sides thereof to thereby provide a surface adhesive property.

Cellophane, fabric (non-woven fabric or the like), paper, polyvinylchloride, polyethylene, polyestere or the like is preferable for the tape-typed base material and as adhesive agent, synchetic resin such as silicon-based resin, polyisobutylene, acrylic resin or the like which are generally used in an adhesive tape is preferable. The scrap movement blocking member 38 with both sides thereof being coated with adherent agent is preferred since the scrap particles may be adhered on both sides thereof to thereby increase a scrap movement blocking effect.

The scrap movement blocking member 38 is attached along the whole periphery of the inner surface located at the vicinity of the tube 3b in order to expose a part of the adhesive surface 38a toward outer diametral direction.

It is preferable that the height of the scrap movement blocking member 38 is so set as to reach the vicinity of the flange 2c at an upper end of the blocking member 38. It should be also noted that the upper end of the scrap movement blocking member 38 may contact the flange 2c or may be detached from the flange 2c.

Furthermore, the uppermost portion of the tube 3b contacting the scrap movement blocking member 38 is preferably provided with a step 3g for positioning the scrap movement blocking member 38, such that attaching work of the scrap movement blocking member 38 may be expedited.

To manufacture the above-mentioned heat insulating container, first of all, the scrap movement blocking member 38 is attached along the whole periphery of the inner surface located at the vicinity of the tube 3b in order to expose a part of the adhesive surface 38a toward outer diametral direction. Successively, the radiation preventing film 10 is covered on the inner casing 2 and the inner casing 2 is arranged in the outer casing 3, where the flange 2c of the inner casing 2 and another flange 3c at the outer casing 3 are mutually joined by way of welding such as vibration welding or the like. At this time of welding, most of the scrap particles scattering from the welded part into the inner diametral direction via the gap 9 are captured on the adhesive surface 38a of the scrap movement blocking member 38, or do not pass the scrap movement blocking member 38 to thereby stay at the outer side thereof.

Furthermore, in case both sides of the scrap movement blocking member 38 are adhesive surfaces, the scrap particles are captured on not only the outer surface 38a but also the inner surface of the scrap movement blocking member 38, such that the scrap particles are securely prevented from moving into the space 4.

According to the second embodiment of the present invention, the heat insulating container having a good looking appearance can be manufactured as that of the first embodiment.

Furthermore, according to the heat insulating container of the second embodiment of the present invention, the movement of scrap particles is blocked by the scrap movement blocking member 38 blocking a portion upper than the welding portion of the flanges 2c and 3c to thereby make it difficult for the scrap particles to move toward the space 4. By this, the movement of the scrap particles can be more securely prevented.

Furthermore, since the tape-shaped scrap movement blocking member 38 with the adhesive surface 38a thereof attached to the tube 3b is used, the scrap movement blocking member 38 is solidly secured to the tube 3b to thereby prevent the scrap movement blocking member 38 from being detached.

Next, the third embodiment of the present invention will be described.

Figure 5:
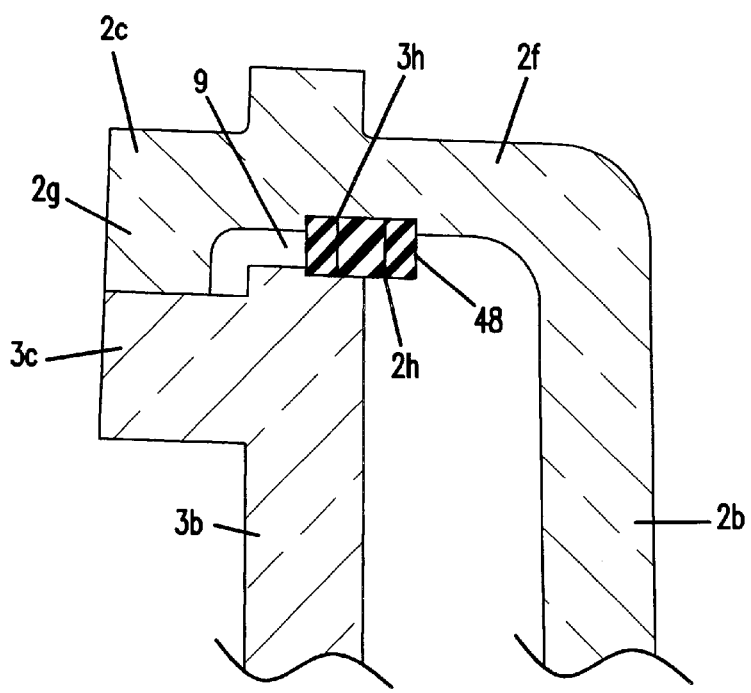
FIG. 5 is a cross-sectional view for illustrating a third embodiment of a heat insulating container according to the present invention.

FIG. 5 illustrates the heat insulating container of the third embodiment according to the present invention, where the heat insulating container of the third embodiment is different from that of the first embodiment in that another type of scrap movement blocking member 48 is used instead of the scrap movement blocking member 8.

The scrap movement blocking member 48 according to the third embodiment is made of elastic material such as foamed urethane resin, silicon-based resin or the like and is a ring-shaped member with a rectangular cross-sectional surface, which is in turn inserted between a base 2f of the flange 2c and the flange 3c.

The height of the scrap movement blocking member 48 is preferred to be a little larger than that of the gap 9. In other words, the scrap movement blocking material 48 is preferred to be so formed as to be resiliently transformed toward compression direction when arranged between the flange 2c and another flange 3c. The gap 9 is sealed over the whole periphery thereof by providing the crap movement blocking member 48.

It is also preferable that the flange 3c is formed with a concave 3h for engaging with the scrap movement blocking member 48 and another flange 2c is preferred to be provided with another concave 2h for engaging with the scrap movement blocking member 48. The installation of the concave 2h and 3h expedites a positioning work of the scrap movement blocking member 48 and simultaneously prevents the position of the scrap movement blocking member 48 from being disoriented.

Furthermore, it should be noted that either one of the concaves 2h or 3h may be formed at the flange in the heat insulating container according to the present invention.

In manufacturing the heat insulating container according to the third embodiment, the inner casing 2 is arranged in the outer casing 3 in order to allow the scrap movement blocking member 48 to be inserted between the base 2f of the flange 2c and another flange 3c, where the two flanges 2c and 3c are mutually joined by welding such as vibration welding or the like.

Most of the scrap particles generated in the process of welding are prevented from moving into the space 4 since the gap 9 is blocked by the scrap movement blocking material 48. The heat insulating container according to the third embodiment can have a good-looking appearance as in the first embodiment.

Furthermore, in the heat insulating container according to the third embodiment, the scrap movement blocking material 48 is inserted between the two flanges 2c and 3c such that the gap 9 is completely sealed to securely block the scattered scrap particles from the welded portion, thereby preventing the external appearance of the heat insulating container from being deteriorated.

Furthermore, because the scrap movement blocking member 48 is made of elastic material, even if the scrap movement blocking material 48 does not conform to that of the gap 9 the scrap movement blocking material 48 can be elastically deformable according to a gap dimension thereby securely sealing the gap 9 and thus securely preventing the scrap particles from moving in to the space.

Now, the fourth embodiment of a heat insulating container according to the present invention will be described.

Figure 6:
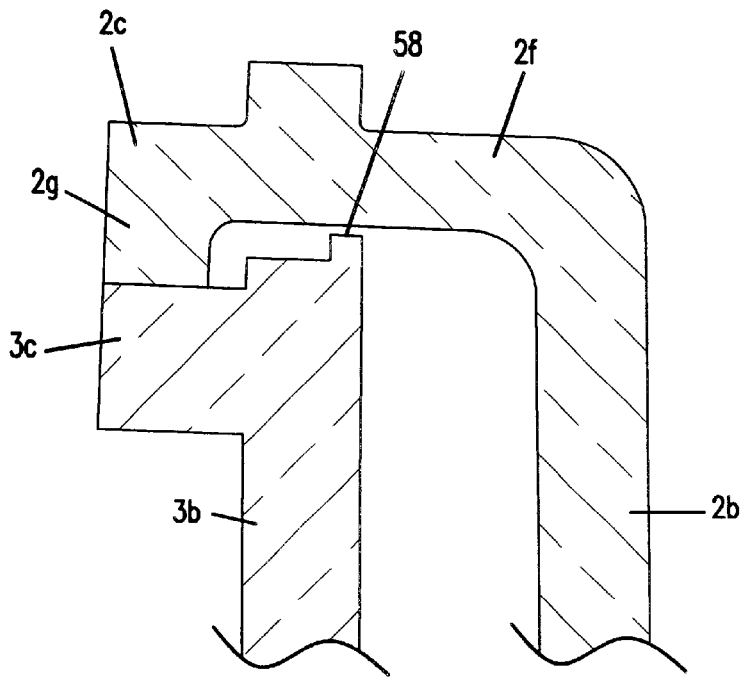
FIG. 6 is a cross-sectional view for illustrating a fourth embodiment of a heat insulating container according to the present invention.

FIG. 6 illustrates the fourth embodiment of the heat insulating container according to the present invention, where the heat insulating container of the fourth embodiment is different from that of the first embodiment in that it is free from scrap movement blocking member, whereas a scrap movement blocking wall 58 is formed at the upper portion of the tube 3b.

The scrap movement blocking wall 58 is protrusively formed over the whole periphery from the uppermost portion of the tube 3b to the upward direction.

In the heat insulating container according to the fourth embodiment, most of the scrap particles generated in the process of welding can not climb over the scrap movement blocking wall 58, only to stay outside of the scrap movement blocking wall 58.

The heat insulating container according to the fourth embodiment can also obtain a good-looking appearance as in the first embodiment of the present invention.

Furthermore, there is another advantage in that manufacturing process may be facilitated since there is no need of installing a scrap movement blocking member.

Figure 7:
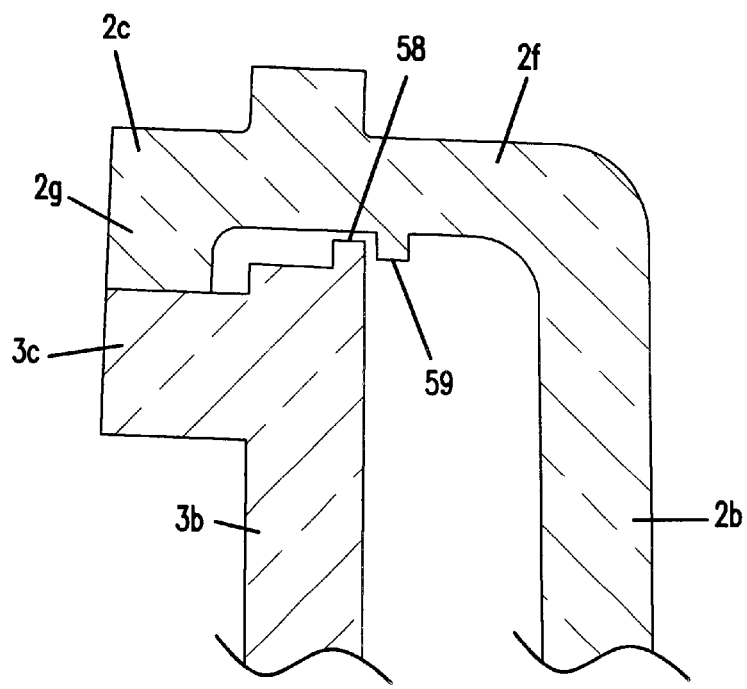
FIG. 7 is a cross-sectional view for illustrating a modified embodiment of a heat insulating container illustrated in FIG. 6.

Still furthermore, as shown in FIG. 7, in addition to the construction of the fourth embodiment, a downward-protruding scrap movement blocking wall 59 may be formed over the whole periphery of the base 2f slightly inwardly positioned from the wall 58 to the diametral direction.

Although each of the above embodiments has presented a welding method performed in a container where the flanges (2c and 3c) are upwardly facing, conversely, the welding may be done with the opening of the container (the flanges) facing downward.

Accordingly, the scrap particles can be avoided from falling to the space to be securely prevented from moving in to the space.

Although each of the above four embodiments has disclosed a heat insulating container where the inner casing and the outer casing are joined at each opening (flange) thereof, the present invention is not to be limited to the above embodiments. In other words, the present invention can be applied to all the shapes of double-walled heat insulating container, where an inner casing, an inner bottom portion thereof and an outer casing are formed into an integral body, and an outer casing of the double-walled container having a bottomed inner casing is joined thereunder to an outer bottom member having an outer bottom with a space therebetween.

As apparent from the foregoing, there is an advantage in the heat insulating container according to the present invention thus described in that scraps of the casings generated in the process of welding the inner and outer casings are prevented from moving into the space, such that a good-looking appearance of a heat insulating container can be obtained even if the container is made of transparent materials.

Furthermore, even in case the container is rocked or shaken, the previous problem that the scrap particles in the space generate a noisy sound by colliding against the casings can be prevented in advance.

What is claimed is:

1. A heat insulating container comprising:

an outer casing;

an inner casing arranged in the outer casing so as to maintain a space therebetween, the inner casing and the outer casing being joined by welding; and a scrap movement blocking member provided at least at one of the inner casing and the outer casing for preventing scraps generated in the process of welding from moving into the space wherein the scrap movement block member has a surface adhesive property to thereby capture the scraps on the surface thereof.

* * * * *